United States Patent [19]

Bauer et al.

[11] Patent Number: 5,623,014
[45] Date of Patent: Apr. 22, 1997

[54] DISPERSION OR SOLUTION CROSSLINKABLE AT ROOM TEMPERATURE WITH HYDROXYLAMINES OR OXIME ETHERS

[75] Inventors: Gerhard Bauer, Weinheim; Oral Aydin; Kaspar Bott, both of Mannheim; Horst Neuhauser, Dudenhofen; Gregor Ley, Wattenheim; Albrecht Zosel, Weinheim; Jochen Wild, Ruppertsberg; Albrecht Harreus, Ludwigshafen; Eckehardt Wistuba, Bad Durkheim, all of Germany

[73] Assignee: Basf Aktiengesellschaft, Ludwigshafen, Germany

[21] Appl. No.: 347,466

[22] PCT Filed: Jun. 3, 1993

[86] PCT No.: PCT/EP93/01395

§ 371 Date: Dec. 13, 1994

§ 102(e) Date: Dec. 13, 1994

[87] PCT Pub. No.: WO93/25588

PCT Pub. Date: Dec. 23, 1993

[30] Foreign Application Priority Data

Jun. 13, 1992 [DE] Germany ............... 42 19 384.2

[51] Int. Cl.⁶ .................................................. C08F 8/30
[52] U.S. Cl. .......................... 524/543; 524/589; 524/601; 525/328.6; 525/328.7; 525/377; 525/437; 525/452; 525/460
[58] Field of Search ................ 525/377, 328.6, 525/328.7, 437, 452, 460; 524/543, 589, 601

[56] References Cited

U.S. PATENT DOCUMENTS

| | | | |
|---|---|---|---|
| 3,268,480 | 8/1966 | Wagenaat et al. | 525/377 |
| 3,293,216 | 12/1966 | Koral | 525/377 |
| 3,373,141 | 3/1968 | Aftergut | 525/377 |
| 4,396,738 | 8/1983 | Powell. | |
| 5,272,218 | 12/1993 | Cheng et al. | 525/377 |
| 5,278,225 | 1/1994 | Kohlhammer et al. | 524/560 |

FOREIGN PATENT DOCUMENTS

| | | |
|---|---|---|
| 3516 | 1/1979 | European Pat. Off. . |
| 3112117 | 3/1981 | Germany . |
| 3521678 | 6/1985 | Germany . |
| 3807555 | 3/1988 | Germany . |

*Primary Examiner*—Bernard Lipman
*Attorney, Agent, or Firm*—Oblon, Spivak, McClelland, Maier & Neustadt, P. C.

[57] ABSTRACT

A dispersion or solution of a free radical polymer, polycondensate or polyadduct, which consist of from 0.001 to 20% by weight of aldehyde groups —CHO or keto groups —CO—, contains, as a crosslinking agent, a compound having at least two $H_2N$—O—groups or oxime ether groups derived therefrom.

6 Claims, No Drawings

DISPERSION OR SOLUTION CROSSLINKABLE AT ROOM TEMPERATURE WITH HYDROXYLAMINES OR OXIME ETHERS

The present invention relates to a dispersion or solution of a free radical polymer, polycondensate or polyadduct which consists of from 0.001 to 20% by weight of aldehyde groups —CHO or keto groups —CO— and contains, as a crosslinking agent, a compound having at least two $H_2N$—O— groups or oxime ether groups derived therefrom.

Copolymers which are used in coating materials or adhesives are often crosslinkable copolymers. For example, protective coatings or adhesive coatings having good elastic properties, high cohesion, ie. internal strength, and high resistance to chemicals and solvents can be obtained by crosslinking.

For crosslinking, a crosslinking agent which reacts with functional groups of a copolymer is generally added to the copolymer.

Possible crosslinking agents are, for example, polyisocyanates which react with hydroxyl or amino groups.

DE-A-35 21 618 discloses corresponding aqueous adhesive formulations in which polyisocyanates dispersed in water are added, as crosslinking agents, to aqueous dispersions of copolymers obtained by free radical polymerization. Similar adhesive formulations are also described in U.S. Pat. No. 4,396,738 and DE-A-31 12 117.

However, the disadvantage of these aqueous formulations is the poor shelf life. The polyisocyanate must therefore be dispersed in water shortly before its use as a crosslinking agent and mixed with the copolymer.

A longer shelf life can be achieved by reacting the isocyanate groups with blocking agents, for example oximes, caprolactams, phenols or dialkyl maleates. The resulting block polyisocyanates undergo hydrolysis in aqueous dispersion only to a minor extent.

DE-A-38 07 555 relates to such a diisocyanate which is blocked with oximes, is dispersed in water and is suitable as an additive for polymers dispersed in water.

However, crosslinking reactions occur only after elimination of the blocking agent above about 130° C.

Conventional aqueous adhesive formulations containing polyisocyanates as crosslinking agents therefore either have a short shelf life and hence can be used only as the two-component system or undergo crosslinking only at high temperatures.

Aqueous dispersions which have a long shelf life and undergo crosslinking at room temperature after removal of the solvent are disclosed in EP-A-3516. These dispersions contain polyhydrazides which react with carbonyl-containing monomers present as polymerized units in the copolymer.

There is in principle a need for further dispersions which undergo crosslinking at room temperature, in order to be able to provide alternatives to the polyhydrazide crosslinking. Furthermore, these dispersions have good performance characteristics, for example good adhesion, in particular wet adhesion to a very wide range of substrates.

It is an object of the present invention to provide dispersions or solutions of crosslinkable copolymers, which dispersions or solutions have a long shelf life, contain a crosslinking agent and are crosslinkable at room temperature.

We have found that this object is achieved by the dispersion or solution defined above and its use as a coating material or adhesive.

The crosslinking of the keto- or aldehyde-containing free radical polymers, polycondensates or polyadducts with the crosslinking agents which contain at least two $H_2N$—O— groups of oxime ether groups derived therefrom occurs on removal of the liquid phase of the dispersion or solution and probably takes place according to the following schemes:

with hydroxylamine derivatives

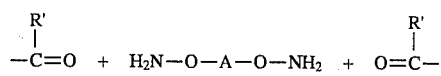

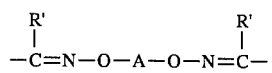

with oxime ethers

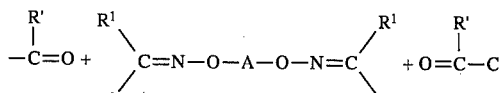

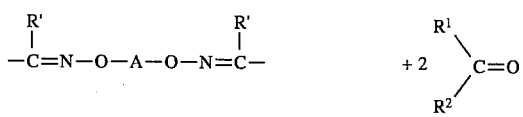

When crosslinking agents having $H_2N$—O— groups or oxime ether groups derived therefrom are used, the same, crosslinked end product is therefore obtained. The crosslinking reaction is an oximation in the first case and a transoximation in the second case.

Further embodiments relate to the components of the novel dispersion or solution and their preparation and their use.

The novel dispersion or solution contains a polymer, polycondensate or polyadduct which consists of from 0.001 to 20, preferably from 0.01 to 10, very particularly preferably from 0.05 to 3, % by weight of aldehyde groups —CHO or keto groups —CO—.

These may be, for example, a copolymer obtained by free radical polymerization, a polyester as a polycondensate or a polyurethane as a polyadduct.

In the case of the copolymers obtained by free radical polymerization, the aldehyde or keto groups are preferably incorporated by polymerization of ethylenically unsaturated compounds which contain these groups.

They are preferably ethylenically unsaturated compounds having one or two aldehyde or keto groups or one aldehyde and one keto group and an olefinic double bond capable of undergoing free radical polymerization (referred to below as monomer a)).

A polyester may contain, for example, a monoalcohol, a diol, a monocarboxylic acid or a dicarboxylic acid, and a polyurethane may contain, for example, a mono- or diisocyanate or likewise a monoalcohol or diol, which contain aldehyde or keto groups.

Examples of monoalcohols are hydroxyacetone, hydroxybenzaldehyde, acetoin and benzoin.

Suitable monocarboxylic acids are, for example, ketocarboxylic acids, such as pyruvic acid or levulinic acid.

Compounds having aldehyde or keto groups may not only be bound in the polymers, polycondensates or polyadducts as component of the main chain but may also be bound to the polymers, polycondensates or polyadducts by reaction with reactive groups in the polymer main chain.

A copolymer which is obtained by free radical polymerization and consists of the monomers a), which contain aldehyde or keto groups, and further monomers b) and c) is preferred.

Examples of suitable monomers a) are acrolein, methacrolein, vinyl alkyl ketones where the alkyl radical is of 1 to 20, preferably 1 to 10, carbon atoms, formylstyrene, alkyl (meth)acrylates where the alkyl radical contains one or two keto or aldehyde groups or one aldehyde and one keto group and is preferably of 3 to 10 carbon atoms altogether, for example (meth)acrylyloxy-alkylpropanals, as described in DE-A-27 22 097. N-oxoalkyl(meth)acrylamides, as disclosed in, for example, U.S. Pat. No. 4,226,007, DE-A-20 61 213 or DE-A-22 07 209, are also suitable.

Acetoacetyl (meth)acrylate, acetoacetoxyethyl (meth)acrylate and in particular diacetoneacrylamide are particularly preferred.

The main monomers b) are present in the copolymer in particular in amounts of from 20 to 99.99, preferably from 60 to 99.9, particularly preferably from 80 to 99.5, by weight, based on the copolymer.

Suitable monomers b) are esters of acrylic or methacrylic acid with alkyl alcohols of 1 to 20 carbon atoms. Examples of such alcohols are methanol, ethanol, n-propanol, isopropanol, n-butanol, sec-butanol, tert-butanol, n-pentanol, isoamyl alcohol, n-hexanol, octanol, 2-ethylhexanol, lauryl alcohol and stearyl alcohol.

Good results are obtained with alkyl (meth)acrylates having a $C_1$–$C_{10}$-alkyl radical, such as methyl methacrylate, methyl acrylate, n-butyl acrylate, ethyl acrylate and 2-ethyl acrylate.

Mixtures of the alkyl (meth)acrylates are also particularly suitable.

Vinyl esters of carboxylic acids of 1 to 20 carbon atoms, such as vinyl laurate, vinyl stearate, vinyl propionate and vinyl acetate are also suitable.

Suitable vinylaromatic compounds of up to 20 carbon atoms are vinyltoluene, α- and p-styrene, α-butylstyrene, 4-n-butylstyrene, 4-n-decylstyrene and preferably styrene. Examples of ethylenically unsaturated nitriles are acrylonitrile and methacrylonitrile.

The vinyl halides are ethylenically unsaturated compounds substituted by chlorine, fluorine or bromine, preferably vinyl chloride and vinylidene chloride.

Examples of nonaromatic hydrocarbons having 2 to 8 carbon atoms and at least two conjugated olefinic double bonds are butadiene, isoprene and chloroprene.

The monomers b) may be used in particular as a mixture, especially to obtain desired glass transition temperatures of the copolymer.

Examples of suitable further copolymerizable monomers c), ie. those which are not covered by a) and b), are esters of acrylic and methacrylic acid with alcohols of 1 to 20 carbon atoms, which contain at least one further hetero atom in addition to the oxygen atom in the alcohol group and/or which contain an aliphatic or aromatic ring.

Examples are 2-ethoxyethyl acrylate, 2-butoxyethyl (meth)acrylate, dimethylaminoethyl (meth)acrylate, diethylaminoethyl (meth)acrylate, aryl, alkaryl or cycloalkyl (meth)acrylates, such as cyclohexyl (meth)acrylate, phenyl ethyl (meth)acrylate or phenylpropyl (meth)acrylate, or acrylates of heterocyclic alcohols, such as furfuryl (meth)acrylate.

Further comonomers, such as (meth)acrylamide and its derivatives substituted at the nitrogen by $C_1$–$C_4$-alkyl may also be mentioned.

Comonmers having hydroxyl functions, for example $C_1$–$C_{15}$-alkyl (meth)acrylates which are substituted by one or two hydroxyl groups, are also particularly important. Especially important comonomers having hydroxyl functions are hydroxy-$C_1$–$C_8$-alkyl (meth)acrylates, such as hydroxyethyl, hydroxy-n-propyl or hydroxy-n-butyl (meth) acrylate.

The presence of comonomers having salt-forming groups is preferable, for example, for the preparation of self-dispersible copolymers which are suitable, for example, for aqueous secondary dispersions. Comonomers having salt-forming groups are in particular itaconic acid, acrylic acid and methacrylic acid.

The amount of further comonomers in the copolymer may be in particular from 0 to 50, preferably from 0 to 20, very particularly preferably from 0 to 10, % by weight.

The amounts of the monomers a), b) and c) sum to 100% by weight.

The amount of the monomers a) is chosen so that the abovementioned content of aldehyde or keto groups is present in the copolymer.

A copolymer is prepared by free radical polymerization. Suitable polymerization methods, such as mass, solution, suspension or emulsion polymerization, are known to the skilled worker.

The copolymer is preferably prepared by solution polymerization with subsequent dispersing in water, but particuarly preferably by emulsion polymerization, the copolymer being obtained as an aqueous dispersion.

In the emulsion polymerization, the comonomers can be polymerized in a conventional manner in the presence of a water-soluble initiator and of an emulsifier at, preferably, from 30° to 95° C.

Examples of suitable initiators are sodium persulfate, potassium persulfate, ammonium persulfate, tert-butyl hydroperoxides, water-soluble azo compounds or redox initiators.

Examples of emulsifiers used are alkali metal salts of relatively long-chain fatty acids, alkylsulfates, alkylsulfonates, alkylated alkylsulfonates or alkylated diphenyl ether sulfonates.

Other suitable emulsifiers are reaction products of alkylene oxides, in particular ethylene oxide or propylene oxide, with fatty alcohols, fatty acids or phenols or alkylphenols.

In the case of aqueous secondary dispersions, the copolymer is first prepared by solution polymerization in an organic solvent and is then dispersed in water without the use of an emulsifier or dispersant with the addition of salt formers, for example of ammonia to carboxyl-containing copolymers. The organic solvent can be distilled off. Preparation of aqueous secondary dispersions is known to the skilled worker and is described in, for example, DE-A-37 20 860.

Regulators may be used for adjusting the molecular weight in the polymerization. For example, -SH-containing compounds, such as mercaptoethanol, mercaptopropanol, thiophenol, thioglycerol, ethyl thioglycolate, methyl thioglycolate and tert-dodecylmercaptan, are suitable.

The type and amount of the comonomers is advantageously chosen so that the resulting copolymer has a glass transition temperature of, preferably, from −60° to 140° C. Depending on whether rigid or flexible coatings are required, high or low glass transition temperatures are obtained by the choice of the monomers. The glass transition temperature of the comonomer can be determined by conventional methods, such as differential thermal analysis or differential scanning calorimetry (cf. for example ASTM 3418/82, ie. midpoint temperature).

The novel dispersion or solution furthermore contains, as a crosslinking agent, a compound having at least two H$_2$NO— groups or oxime ether groups derived therefrom. As is generally known, oximes are the reaction products of compounds having keto or aldehyde groups with hydroxylamine derivatives. This crosslinking agent may be an aliphatic, cycloaliphatic or aromatic compound.

It is preferably a hydroxylamine derivative of the general formula

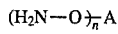   I where A is a saturated or unsaturated aliphatic, linear or branched hydrocarbon radical of 2 to 12 carbon atoms which may be interrupted by from 1 to 3 nonadjacent oxygen atoms and n is 2, 3 or 4, or an oxime ether of the formula

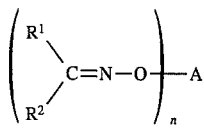   II where A and n have the abovementioned meanings and R$^1$ and R$^2$, independently of one another, are each C$_1$–C$_{10}$-alkyl, C$_1$–C$_{10}$-alkoxy, C$_5$–C$_{10}$-cycloalkyl or C$_5$–C$_{10}$-aryl, each of which may furthermore contain from 1 to 3 nonadjacent nitrogen, oxygen or sulfur atoms in the carbon chain or in the carbon ring and may be substituted by 1 to 3 C$_1$–C$_4$-alkyl or C$_1$–C$_4$-alkoxy groups, or may be hydrogen or R$^1$ and R$^2$ together form a bridge of 2 to 14 carbon atoms, where some of the carbon atoms may also be part of an aromatic ring system.

In the formulae I and II, A is preferably a hydrocarbon chain of 2 to 8 carbon atoms and n is preferably 2.

R$^1$ and R$^2$ are each preferably hydrogen, C$_1$–C$_8$-alkyl or C$_1$–C$_8$-alkoxy. In the case of the hydrogen atoms, only one of the radicals R$^1$ or R$^2$ may be hydrogen.

The preparation of the compounds of the formula I is described, for example, by Dabney White Dixon and Randy H. Weiss or Ludwig Bauer and K. S. Luresch in J. Org. Chem. 49 (1984), 4487–4494 and 28 (1963), 1604–1608.

Accordingly, the hydroxylamine derivatives can be converted, for example by reacting dibrominated compounds with N-hydroxyphthalimide, with substitution of the bromine atoms, into phthalimidooxy derivatives, in which the hydroxylamine derivatives are then formed by hydrolysis.

The hydroxylamine derivatives are also obtainable via the oxime ether as an intermediate (Zh. Org. Khim. 24 (1988), 2538 and J. Med. Chem. 7 (1964), 329).

While hydroxylamine derivatives of the formula I are prepared in general by means of a more or less expensive protective group method, corresponding oxime ethers of the formula II are obtainable directly by reacting the alkali metal salts of oximes with dihalo compounds (Zh. Org. Khim. 24 (1988), 2538 et seq.).

The reaction of the oxime with a dihalo compound in aqueous sodium hydroxide solution in the presence of a phase transfer catalyst, eg. tetrahexylammonium chloride, is particularly advantageous, and no solvent may be used.

The amount of the crosslinking agent having at least two H$_2$N—O— groups or oxime ether groups derived therefrom is preferably from 0.01 to 30, particularly preferably from 0.1 to 20, very particularly preferably from 0.1 to 5, % by weight, based on the polymer, polycondensate or polyadduct. The content of crosslinking agent is advantageously chosen so that the H$_2$N—O— groups and/or oxime ether groups are present in a roughly equimolar ratio to the keto and/or aldehyde groups.

The solids content of the novel dispersion or solution is preferably from 20 to 90, in particular from 30 to 70, % by weight.

The novel dispersion or solution is suitable as a coating material for various substrates having plastic, wood or metal surfaces or, for example, for textiles, nonwovens, leather or paper. It is also suitable for applications in building chemistry, for example as adhesives, sealing materials, binders or the like. The coatings may be, for example, surface coatings, protective coatings or adhesive coatings.

An aqueous dispersion of a copolymer obtained by free radical polymerization is particularly suitable for the stated use.

The aqueous dispersion may also contain organic, preferably water-miscible solvents as auxiliary solvents.

The novel dispersion or solution may contain conventional assistants and additives, depending on the intended use. These include, for example, fillers, such as quartz powder, quartz sand, finely divided silica, barite, calcium carbonate, chalk, dolomite or talc, which are often used together with suitable wetting agents, for example polyphosphates, such as sodium hexametaphosphate, naphthalenesulfonic acid or ammonium or sodium polyacrylates, the wetting agents generally being added in an amount of from 0.2 to 0.6% by weight, based on the filler.

If desired, fungicides for preservation are used in general in amounts of from 0.02 to 1% by weight, based on the total dispersion or solution. Examples of suitable fungicides are phenol or cresol derivatives or organotin compounds.

The novel dispersion or solution, especially as an aqueous dipsersion of a free radical copolymer, is particularly suitable as a sealant or adhesive, especially, for example, as a laminating adhesive for the production of laminated films and high-gloss films. As an adhesive, the dispersions may contain, in addition to the abovementioned additives, also specific assistants and additives conventionally used in adhesive technology. These include, for example, thickeners, plasticizers or tackifiers, for example natural resins or modified resins, such as rosin esters or synthetic resins, such as phthalate resins.

Dispersions which are used as adhesives particularly preferably contain alkyl (meth)acrylates as comonomers b) in the copolymer.

For use as an adhesive formulation, the glass transition temperature of the copolymers is preferably brought to values of from 0° to –40° C.

When used as an adhesive, the dispersions surprisingly also exhibit very good adhesion, in particular wet adhesion.

The pH of the dispersion is preferably brought to a value of from 2 to 9 since the crosslinking reaction with the copolymers can be acid-catalyzed.

The novel dispersion or solution has a long shelf life. The crosslinking reaction takes place at as low as room temperature with removal of the liquid phase, for example volatilization of the water.

Volatilization of the water can be accelerated by increasing the temperature, for example to 30°–100° C.

In the coating of substrates, it is in principle also possible to apply a dispersion or solution of the polymer, polycondensate or polyadduct, which does not contain the hydroxylamines or oxime ether derivatives, to a surface to which hydroxylamines or oxime ethers have already been applied beforehand in a separate operation.

In this case, the hydroxylamines or oxime ether derivatives act as primers.

After application of the dispersion or solution, crosslinking then occurs as above.

EXAMPLES

I. Hydroxylamine derivatives as crosslinking agents

Preparation of the copolymers

Copolymer dispersion 1

In a reaction vessel having a stirrer and two feed vessels (feed 1 and feed 2), 200 g of demineralised water, 37 g of feed 1 (see below) and 20 g of feed 2 were initially taken and were heated to 85° C. After 15 minutes, feed 1 was added uniformly to the reaction vessel in the course of 2 hours and feed 2 was introduced uniformly in the course of 2.5 hours. After the final addition of initiator (feed 2), the dispersion was stirred for a further hour at 85° C.

Feed 1: (This feed was stirred during the polymerization)
107.5 g of demineralised water
400 g of ethyl acrylate
90 g of methyl methacrylate
50 g of 20% strength by weight aqueous diacetoneacrylamide solution
50 g of a 20% strength by weight solution of the sodium salt of p-dodecyldiphenyl ether disulfonate in water (emulsifier)
50 g of a 20% strength by weight solution of the reaction product of p-isononylphenol with about 50 mol of ethylene oxide in water (emulsifier)

Feed 2:
100 g of demineralised water
3 g of sodium persulfate

Copolymer dispersions 2 to 6 were prepared in a similar manner (Table 1).

TABLE 1

Composition of the copolymers in % by weight

| Copolymer dispersion | EA | MMA | HEA | DAA | AAEM |
|---|---|---|---|---|---|
| 1 | 80 | 18 | | 2 | |
| 2 | 99 | | | 1 | |
| 3 | 96 | | | 4 | |
| 4 | 77.7 | 17.4 | | | 4.9 |
| 5 | 80 | 18 | 2 | | |
| 6 | 99 | | 1 | | |

Abbreviations
EA: Ethyl acrylate
MMA: Methyl methacrylate
HEA: Hydroxyethyl acrylate
DAA: Diacetoneacrylamide
AAEM: Acetoacetoxyethyl methacrylate The hydroxylamine derivatives A: $H_2N-O-(CH_2)-O-NH_2$
B: $H_2N-O-(CH_2)_4-O-NH_2$
C: $H_2N-O\frown\frown O-NH_2$ were added to the resulting dispersions in amounts such that they were equimolar amounts of the amino groups, based on the aldehyde or keto groups.

The preparation of the substances A to C is described by L. Bauer and K. S. Suresh in J. Org. Chem. 28 (1963), 1604.

The mixtures obtained had a long shelf life.

Testing for Crosslinkability (Swelling) and Testing of Performance Characteristics (High-gloss Films)

Swelling

The dispersion formulations were converted into films and the latter were dried for 1 week at room temperature. Thereafter, the swelling behavior was investigated as a measure of the degree of crosslinking of these films in tetrahydrofuran, by storing about 1 g of a film of the sample in toluene and dimethylformamide for 2 days and measuring the solvent absorption in %.

Increasing crosslinking density results in a decrease in the solvent absorption on swelling.

Uncrosslinked or scarcely crosslinked polymers are dissolved or swell to an excessive extent owing to the extremely low crosslinking density. (Results in Table 2)

High-gloss film test

The dispersion formulations were applied by means of a knife coater to give a dry layer having a thickness of 5 g/m² on boxboards printed with offset inks, and were dried at 60° C. and, after about 30 seconds, laminated with biaxially oriented polypropylene films (o-PP).

A check was carried out to determine whether paper and ink are torn off the boxboard when peeling off the film (peel test) (rating 1: paper or ink completely torn off, rating 2: paper or ink partially torn off) and whether the film exhibits delamination or is not in firm contact in the region of grooves (embossings in the boxboard) (groove stability; +=no delamination at the groove, −=delamination at the groove and +/−=partial delamination at the groove). (Results in Table 2).

TABLE 2

| Dispersion | Crosslinking agent | Solvent absorption % | Peel test | Groove stability |
|---|---|---|---|---|
| 1 | A | 500 | 1 | + |
| 2 | A | 580 | 1 | + |
| 3 | A | 490 | 1 | + |
| 4 | A | 560 | 1 | + |
| 1 | B | 520 | 1 | + |
| 2 | B | 490 | 1 | + |
| 3 | B | 500 | 1 | + |
| 4 | B | 570 | 1 | + |
| 1 | C | 560 | 1 | + |
| 3 | C | 580 | 1 | + |
| For comparison | | | | |
| 5 | A | 1000* | 1 | +/− |
| 5 | B | 1100* | 1 | +/− |
| 6 | A | 1600* | 1 | +/− |
| 6 | B | 1500* | 1 | +/− |
| 1 | — | —* | 2 | − |
| 3 | — | —* | 2 | − |

*Sample was for the most part dissolved

Preparation of Emulsion Paints

The following were used as polymers for the preparation of emulsion paints (parts are by weight):

| Polymer dispersion | Composition |
|---|---|
| 7 (Comparison): | Copolymer of 50 parts of methyl methacrylate and 50 parts of n-butyl acrylate |
| 8 (Comparison): | Copolymer and crosslinking agent of 50 parts of methyl methacrylate, 45 parts of ethyl methacrylate, 3 parts of diacetoneacrylamide (copolymer) and in addition 2 parts of adipic dihydrazide (crosslinking agent) |
| 9: | Copolymer and crosslinking agent of 51 parts of methyl methacrylate, 43 parts of n-butyl acrylate, 4 parts of diacetoneacrylamide (copolymer) and 2 parts of hydroxylamine derivative (crosslinking agent) |

Emulsion paints were prepared with the polymer dispersions according to the following formulation.

| Components | Parts by weight |
|---|---|
| Polyurethane thickener, 25% strength by weight in water/butyldiglycol (1:4) | 10.0 |
| Na salt of an acrylic acid polymer (pigment dispersant) | 8.0 |
| Concentrated ammonia | 0.2 |
| Preservative | 0.2 |
| Silicone-based antifoam | 0.3 |
| $TiO_2$ | 22.3 |
| Propylene glycol | 9.9 |
| Butyldiglycol | 2.5 |
| Isopropylethylene glycol | 1.2 |
| Water | 1.6 |
| Polymer dispersion, 50% strength by weight | 54 |

The emulsion paints were tested for wet adhesion and gloss:

Wet Adhesion Test

The emulsion paint was applied, in a wet layer thickness of 200 µm, to a sample coated with an alkyd varnish. After drying for 3 days at 23° C./65% relative humidity, the sample was placed in water at room temperature for 8 hours, frozen at −20° C. for 16 hours and then placed in water at 23° C. for 10 minutes.

The adhesion of the emulsion paint to the alkyd varnish was tested. For this purpose, an attempt was made to remove the emulsion paint with a fingernail.

Very good wet adhesion is present if the emulsion paint cannot be removed, and no wet adhesion is present if it can be completely removed.

| Properties of the emulsion paint | 7 | 8 | 9 |
|---|---|---|---|
| Wet adhesion | None | Satisfactory* | Very good |

*Paint can be partially removed

II. Oxime Ethers as Crosslinking Agents

Preparation of the Oxime Ether

Acetone oxime 1,4-butylene ether

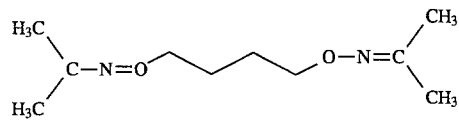

A mixture of 75.0 g of a 40% strength sodium hydroxide solution, 32.0 g (0.25 mol) of 1,4-dichlorobutane, 36.5 g (0.50 mol) of acetone oxime and 1.0 g of tetrahexylammonium chloride is refluxed for 7 hours. The reaction mixture is diluted with 100 ml of water to dissolve the precipitated sodium chloride, and the upper phase containing the desired product is separated off in a separating funnel. The latter contains 37 g (74% yield) of acetone oxime 1,4-butylene ether, which is purified by distillation under reduced pressure; bp.=119° to 121° C. at 18 mbar.

The oxime ethers in Table 3 were prepared in a similar manner ($R^1$, $R^2$ and A corresponding to the formula I).

TABLE 3

| Oxime ether | $R^1$ | $R^2$ | A |
|---|---|---|---|
| D | $H_3C-$ | $H_3C-$ | $-C_4H_8-$ |
| E | $H_3C-$ | $H_5C_2O-$ | $-C_4H_8-$ |
| F | $H-$ | tert-butyl | $-C_4H_8-$ |
| G | $H-$ | $-C(=O)-CH_3$ | $-C_4H_8-$ |
| H | $H_3C-$ | tert-butyl | $-C_4H_8-$ |
| I | $H_3C-$ | $H_3C-$ | $-C_6H_{12}-$ |

Preparation of Copolymer Dispersions

The preparation was carried out as described under I. The composition of the copolymers is shown in Table 4.

TABLE 4

| | Composition of the copolymer in % by weight | | | | |
|---|---|---|---|---|---|
| Copolymer dispersion | EA | MMA | HEA | DAA | AAEM |
| 10 | 96 | | | 4 | |
| 11 | 77.7 | 17.4 | | | 4.9 |
| 12 | 96 | | 2 | 2 | |

Test for Crosslinkability (Swelling) and of Performance Characteristics

Oxime ethers D-I were each added to the dispersions, the oxime groups being present in an equimolar amount relative to the keto or aldehyde groups.

The dispersion formulations obtained had a long shelf life.

For the production of laminated films, the dispersion formulations were applied by knife coating, in a layer which had a thickness of 3 g/m² when dry, to various films heated to 50° C. (polyethylene terephthalate: PETP; polyamide: PA; polyvinyl chloride: PVC, polypropylene (corona-pretreated): PP) and were laminated after 20 seconds with a polyethylene film (corona-pretreated). Thereafter, the films were stored for 7 days at room temperature and under standard humidity conditions and were then cut into 2 cm wide strips. These strips were then peeled at 23° C. at an angle of 180° at a speed of 100 m/min. The peeling force in N was determined for the 2 cm wide strips (Table 5).

TABLE 5

| Dispersion | Cross-linking agent | Solvent absorption % | PETP/PE | PA/PE | PVC/PE | PP/PE |
|---|---|---|---|---|---|---|
| | | | Peel strength of the laminated film in N/cm | | | |
| 10 | E | 1000 | 3.5 | 2.0 | 4.7 | 1.9 |
| 10 | F | 980 | 3.1 | 2.3 | 4.3 | 2.3 |
| 10 | D | 700 | 4.1 | 2.7 | 4.9 | 2.5 |
| 10 | G | 1200 | 2.9 | 2.4 | 4.0 | 2.3 |
| 10 | H | 1000 | 3.0 | 2.8 | 4.2 | 2.1 |
| 10 | I | 1100 | 3.9 | 2.4 | 4.5 | 1.9 |
| 11 | E | 900 | 3.1 | 2.1 | 4.3 | 1.0 |
| 11 | F | 970 | 3.2 | 2.3 | 4.0 | 1.2 |
| 11 | D | 750 | 4.6 | 2.9 | 4.8 | 1.9 |
| 11 | G | 1150 | 3.5 | 2.4 | 4.2 | 1.8 |
| 11 | H | 900 | 3.1 | 2.3 | 4.1 | 1.6 |
| 11 | H | 1059 | 3.7 | 2.4 | 4.4 | 1.7 |
| | | | Red strength of the laminated film in N/cm | | | |
| 12 | E | 1100 | 3.1 | 2.4 | 4.0 | 1.3 |
| 12 | F | 1000 | 3.5 | 2.1 | 4.3 | 1.7 |
| 12 | D | 750 | 4.7 | 2.9 | 4.8 | 1.9 |
| 12 | G | 1150 | 3.9 | 2.0 | 4.2 | 1.4 |
| 12 | H | 1040 | 4.0 | 2.3 | 4.1 | 1.3 |
| 12 | I | 1100 | 3.3 | 2.2 | 4.4 | 1.7 |
| | | For comparison | | | | |
| 10 | — | —* | 0.5 | 0.9 | 0.6 | 0.1 |
| 11 | — | —* | 0.5 | 0.3 | 0.4 | 0.1 |
| 12 | — | —* | 0.5 | 0.2 | 0.4 | 0.1 |

*The polymer had for the most part dissolved

The solvent absorption measured as described under I is also described, as a measure of the crosslinkability.

We claim:

1. A dispersion or solution of a crosslinkable copolymer selected from the group consisting of free radical polymers, polycondensates and polyadducts, which consists of from 0.001 to 20% by weight of aldehyde groups —CHO or keto groups —CO— available for crosslinking and contains, as a crosslinking agent, a compound having at least two oxime ether groups derived from corresponding $H_2N$—O— groups.

2. A dispersion or solution as claimed in claim 1, containing at least one hydroxylamine derivative of the formula

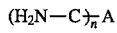  I where A is a saturated or unsaturated aliphatic, linear or branched hydrocarbon radical of 2 to 12 carbon atoms which may be interrupted by from 1 to 3 nonadjacent oxygen atoms and n is 2, 3 or 4, or at least one oxime ether of the formula

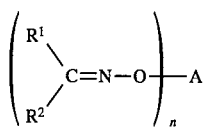  II where A and n have the abovementioned meanings and $R^1$ and $R^2$ independently of one another are each $C_1$–$C_{10}$-alkyl, $C_1$–$C_{10}$-alkoxy, $C_5$–$C_{10}$-cycloalkyl or $C_5$–$C_{10}$-aryl, each of which may furthermore contain from 1 to 3 nonadjacent nitrogen, oxygen or sulfur atoms as hetero atoms in the carbon chain or in the carbon ring and may be substituted by 1 to 3 $C_1$–$C_4$-alkyl or $C_1$–$C_4$-alkoxy groups, $R^1$ or $R^2$ may be hydrogen or $R^1$ and $R^2$ together form a bridge of 2 to 14 carbon atoms, where some of the carbon atoms may also be part of an aromatic ring system.

3. A dispersion or solution as claimed in claim 1, containing a copolymer having a glass transition temperature from −60° to +140° C., wherein the copolymer consists of at least one comonomer having at least one aldehyde or keto group, b) from 20 to 99.99% by weight of at least one $C_1$–$C_{20}$-alkyl (meth)acrylate, one vinyl ester of a carboxylic acid of 1 to 20 carbon atoms, one vinylaromatic of up to 20 carbon atoms, one ethylenically unsaturated nitrile of 3 to 6 carbon atoms, one vinyl halide or one nonaromatic hydrocarbon having 4 to 8 carbon atoms and at least 2 conjugated double bonds and c) from 0 to 50% by weight of at least one further ethylenically unsaturated monomer, the content of the monomer a) being chosen so that the copolymer consists of from 0.001 to 20% by weight of aldehyde groups —CHO or keto groups —CO—, and the monomers a), b) and c) summing to 100% by weight.

4. A coated substrate obtained using a dispersion or solution as claimed in claim 1.

5. A method of coating a substrate which comprises applying the dispersion or solution of claim 1 to the substrate as a coating material.

6. The method according to claim 5, wherein the dispersion or solution has adhesive properties.

* * * * *

UNITED STATES PATENT AND TRADEMARK OFFICE
CERTIFICATE OF CORRECTION

PATENT NO. : 5,623,014
DATED : April 22, 1997
INVENTOR(S) : Gerhard BAUER, et al.

It is certified that error appears in the above-indentified patent and that said Letters Patent is hereby corrected as shown below:

On the title page, Item [73], the assignee's name should read:

--BASF Aktiengesellschaft--

Signed and Sealed this

Twelfth Day of August, 1997

Attest:

BRUCE LEHMAN

*Attesting Officer*    *Commissioner of Patents and Trademarks*